US010242277B1

(12) United States Patent
Manohar et al.

(10) Patent No.: US 10,242,277 B1
(45) Date of Patent: Mar. 26, 2019

(54) VALIDATING DIGITAL CONTENT RENDERING

(71) Applicant: Amazon Technologies, Inc., Seattle, WA (US)

(72) Inventors: Vasant Manohar, Chennai (IN); Janarthanan Lakshmipathy, Coimbatore (IN)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 264 days.

(21) Appl. No.: 14/794,351

(22) Filed: Jul. 8, 2015

(51) Int. Cl.
*G06K 9/00* (2006.01)
*G06K 9/18* (2006.01)
*G06K 9/03* (2006.01)

(52) U.S. Cl.
CPC ......... *G06K 9/036* (2013.01); *G06K 9/00456* (2013.01); *G06K 9/00483* (2013.01); *G06K 9/18* (2013.01)

(58) Field of Classification Search
None
See application file for complete search history.

(56) References Cited

U.S. PATENT DOCUMENTS

| | | | | |
|---|---|---|---|---|
| 2003/0200505 A1* | 10/2003 | Evans | ............... | G06K 9/033 715/256 |
| 2010/0188683 A1* | 7/2010 | Shirai | ............... | G06F 21/608 358/1.13 |
| 2011/0043652 A1* | 2/2011 | King | ............... | G06F 17/2211 348/222.1 |
| 2011/0280481 A1* | 11/2011 | Radakovic | ............... | G06K 9/033 382/177 |
| 2012/0177295 A1* | 7/2012 | Gronau | ............... | G06K 9/03 382/218 |
| 2013/0113806 A1* | 5/2013 | Naveh | ............... | G09G 5/227 345/467 |
| 2014/0168478 A1* | 6/2014 | Baheti | ............... | G06K 9/2081 348/240.99 |

OTHER PUBLICATIONS

Dictionary.com, "Render", Accessed on Dec. 26, 2017.*

* cited by examiner

*Primary Examiner* — Matthew Bella
*Assistant Examiner* — Brian Shin
(74) *Attorney, Agent, or Firm* — Pierce Atwood LLP

(57) ABSTRACT

Devices, systems and methods are disclosed for validating an electronic publication and determining a source of identified errors in a rendering of the electronic publication. The rendering may be captured as a rendered image and rendered data may be extracted from the rendering. The rendered data may be compared to actual input data to the renderer used to generate the rendered image. If errors are visible in the rendering, a source of the errors may be identified based on the comparison between the extracted rendered data to the actual input data. If errors are not visible in the rendering, the rendering may be validated.

21 Claims, 10 Drawing Sheets

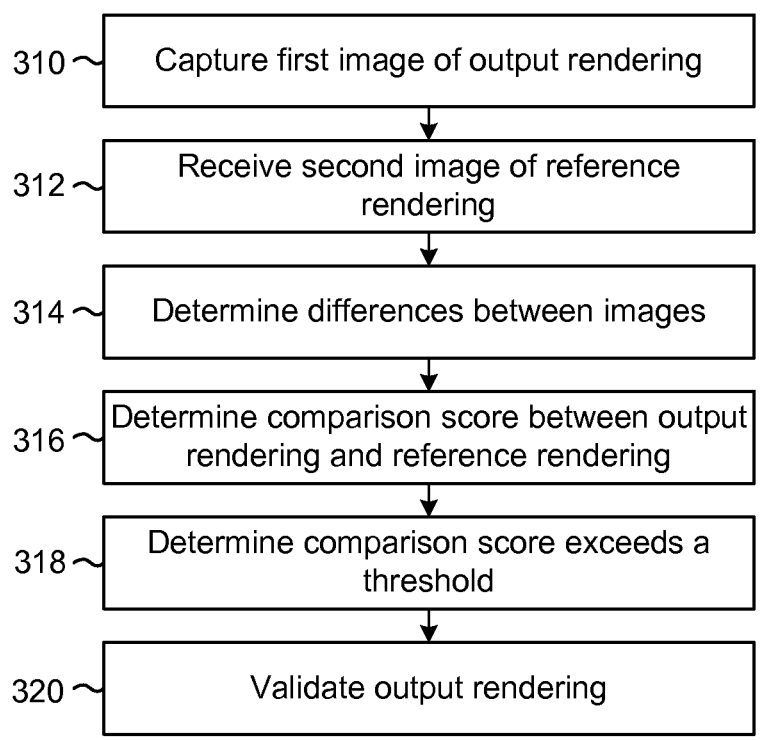

FIG. 4A

Eight o'clock. Break time. A short break spent staring at the sky, reminded of days and clouds that don't move, like butterflies run through with a pin, affixed to a point for all time. Michael leans against the barn's weathered boards, chin down, eyes open and unseeing. There is no wind and no snow, only a hard white-gray crust of snow come and gone. Fossilized snow. Steam rises from the coffee cup in his hand, thin and nearly translucent. "I can stay a week," his daughter had said, fixing him in her eyes, watching him. He'd managed a nod, and finally, "I'd like that."

Device 102    Rendered Display 400

Eight o'clock. Break time. A short break spent staring at the sky, reminded of days and clouds that don't move, like butterflies run through with a pin, affixed to a point for all time. Michael leans against the barn's weathered boards, chin down, eyes open and unseeing. There is no wind and no snow, only a hard white-gray crust of snow come and gone. Fossilized snow. Steam rises from the coffee cup in his hand, thin and nearly translucent. "I can stay a week," his daughter had said, fixing him in her eyes, watching him. He'd managed a nod, and finally, "I'd like that."

Device 102    Reference Display 402

Comparison 404

FIG. 4B

Eight o'clock. Break time. A short break spent staring at the sky, reminded of days and clouds that don't move, like butterflies run through with a pin, affixed to a point for all time. Michael leans against the barn's weathered boards, chin down, eyes open and unseeing. There is no wind and no snow, only a hard white-gray crust of snow come and gone. Fossilized snow. Steam rises from the coffee cup in his hand, thin and nearly translucent. "I can stay a week," his daughter had said, fixing him in her eyes, watching him. He'd managed a nod, and finally, "I'd like that."

Device 102     Reference Display 402

Comparison 414

Eight o'clock. Break time. A short break spent staring at the sky, reminded of days and clouds that don't move, like butterflies run through with a pin, affixed to a point for all time. Michael leans against the barn's weathered boards, chin down, eyes open and unseeing. There is no wind and no snow, only a hard white-gray crust of snow come and gone. Fossilized snow. Steam rises from the coffee cup in his hand, thin and nearly translucent. "I can stay a week," his daughter had said, fixing him in her eyes, watching him. He'd managed a nod, and finally, "I'd like that."

Eight o'clock. Break time. A short break spent staring at the sky, reminded of days and clouds that don't move, like butterflies run through with a pin, affixed to a point for all time. Michael leans against the barn's weathered boards, chin down, eyes open and unseeing. There is no wind and no snow, only a hard white-gray crust of snow come and gone. Fossilized snow. Steam rises from the coffee cup in his hand, thin and nearly translucent. "I can stay a week," his daughter had said, fixing him in her eyes, watching him. He'd managed a nod, and finally, "I'd like that."

Device 102     Rendered Display 410

VALIDATING DIGITAL CONTENT RENDERING

BACKGROUND

With the advancement of technology, the use and popularity of electronic devices has increased considerably. Electronic devices are commonly used to display digital content.

BRIEF DESCRIPTION OF DRAWINGS

For a more complete understanding of the present disclosure, reference is now made to the following description taken in conjunction with the accompanying drawings.

FIG. 3 illustrates an example flowchart for validating rendering using a bitmap comparison.

FIGS. 4A-4B illustrate examples of bitmap comparisons.

DETAILED DESCRIPTION

Electronic devices are increasingly used to display content, such as an electronic publication (e.g., a book, comic book, manga, graphic novel, magazine, fashion magazine, printed map(s) or the like in an electronic format). A key aspect to ensure a quality of an electronic publication or other digital document is a fidelity of device rendering. Typically, a raw input (e.g., information including text strings, font family, styles, etc.) is converted to the electronic publication and the electronic publication is rendered on a display. However, due to issues with one or more of the raw input, the conversion to the electronic publication and/or the rendering of the electronic publication, the rendered electronic publication may appear differently than intended and may include errors.

To validate that the electronic publication is rendered properly, a first image of the rendered electronic publication may be captured and compared to a reference image showing the intended rendering. Parity analysis may then be performed using image comparator techniques, for example by comparing bits between the images. For example, a camera may capture the first image using a new renderer and the reference image using a previously validated renderer, and the first image may be compared to the reference image using a bitmap comparison to detect differences between the first image and the reference image. However, this technique requires that the electronic publication be rendered using the previously validated renderer, which may prevent improvements to the rendering. In addition, due to a large number of electronic publications available, only a fraction of the overall renderings to be displayed may be validated using a reference image. Finally, while this technique identifies differences between the first image and the reference image, it is difficult to identify a source of the error without human intervention.

To validate renderings and determine a source of identified errors, devices, systems and methods are disclosed for extracting rendered data from a rendered display and comparing the rendered data to actual input data to the renderer and/or converter. For example, an electronic publication may be displayed as a series of rendered images and each rendered image may be analyzed to determine the rendered data being displayed. The rendered data may be compared to the actual input data used to generate the rendered image. Thus, accurate renderings may be validated without using a reference rendering, while a number of location of errors in inaccurate renderings may be determined without human intervention. For example, text characters, character styles and paragraph styles may be verified and locations of individual discrepancies determined autonomously.

Figure 1:
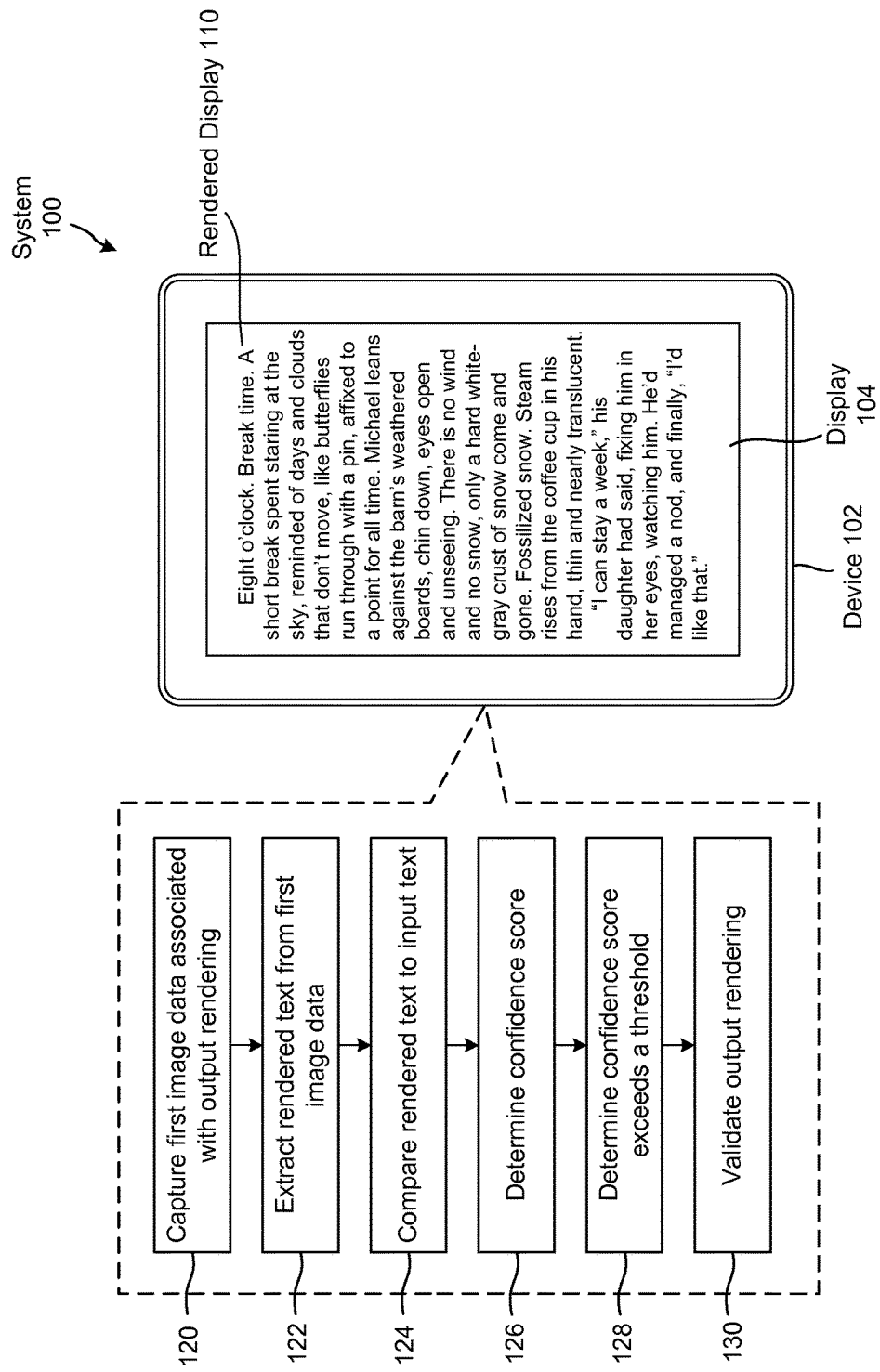
FIG. 1 illustrates an overview of a system for validating digital content according to embodiments of the present disclosure.

FIG. 1 illustrates an overview of a system 100 for implementing embodiments of the disclosure. The system 100 includes a device 102, such as an electronic reader, having a display 104. However, the present disclosure is not limited thereto and the device 102 may be any electronic device including a processor, for example a "headless" device without a built in display that receives image signals and sends them to a separate device for display. As illustrated in FIG. 1, the device 102 may display a rendered display 110 on a display 104. The rendered display 110 may be generated from an electronic publication (e.g., a book, comic book, manga, graphic novel, magazine, fashion magazine, printed map(s) or the like in an electronic format).

The device 102 may capture (120) first image data associated with an output rendering and may extract (122) rendered input data from the first image data. The first image data may be taken from the output of the renderer, where the first image data is rendered data intended for display on the device 102. For example, the device 102 may duplicate first image data sent to the display 104, such as first image data used to generate the rendered display 110, similar to taking a screenshot of the display 104. In contrast to image data captured using an external camera, the first image data may have a higher fidelity and reduced distortion or other degradations caused by the external camera. The first image data may then be analyzed, for example using Optical Character Recognition (OCR) or similar techniques, to extract rendered text. For example, the OCR engine may determine text attribute values, which may include first text characters, first character styles and/or first paragraph styles from the first image data (and thereby may infer those values that were input to the renderer that resulted in the rendered display 110). Examples of text characters may include a string of characters, such as words, numbers and/or punctuation, which makes up a body of text displayed in the rendered display 110. Examples of character styles may include font, formatting, size, style or the like. For example, the text characters may be displayed using a particular font (e.g., a specific font from a font family), a size of the font (e.g., a size of text, such as 12 point font), and/or a style of font (e.g., italic, bold, superscript, subscript, etc.). Examples of paragraph styles may include line spacing, margins, alignment or the like. For example, the text characters may be displayed using line spacing (e.g., 1.5 line spacing), margins (e.g., 0.2" margins), and an alignment (e.g., left aligned).

In some examples, the device 102 may receive second image data from the renderer and may modify the second image data to generate the first image data. For example, the input data may include input text and graphical content and the renderer may render the input text and the graphical content as the second image data. The second image data may be stored in a matrix buffer in the renderer and the device 102 may retrieve the second image data from the matrix buffer to display the second image data on the display 104. The matrix buffer may store a two-dimensional matrix of data including pixel values for each pixel in the second image data.

The renderer may include a text layout engine configured to layout the input text and a graphic layout engine configured to layout the graphical content. While determining the layout for the input text, the text layout engine may determine pixels associated with the input text. For example, the text layout engine may layout each word included in the input text and may determine a group of pixels associated with the layout for each word. The group of pixels associated with the layout for an individual word may form a block of pixels having a height of y pixels and a width of x pixels, such that the group of pixels may be identified from a beginning pixel (e.g., 0, y) associated with a top-left pixel to an end pixel (e.g., x, 0) associated with a bottom-right pixel. The text layout engine may identify a paragraph of words in the input text and may determine a paragraph boundary identifying pixels associated with the layout for words included in the paragraph. For example, the input text may include a first paragraph and a second paragraph and the text layout engine may determine a first paragraph boundary and a second paragraph boundary.

To generate the first image data, the device 102 may retrieve the second image data from the matrix buffer and may determine a text boundary based on the paragraph boundaries associated with the second image data. For example, the device 102 may determine the text boundary to include the first paragraph boundary and the second paragraph boundary, such that that text boundary includes pixels associated with the layout of words included in the first paragraph and the second paragraph. The device 102 may generate the first image data by including portions of the second image data included in the text boundary. Thus, the device 102 may exclude the graphical content included in the second image data outside of the text boundary from the first image data. The device 102 may format the first image data using various formats, such as portable network graphics (PNG) format or the like and may input the first image data to the OCR engine to extract the rendered input data.

The device 102 may compare (124) the rendered text data to the input text used to create the rendering. The input data may include second text characters, second character styles and/or second paragraph styles that were input to the renderer to generate the rendered display 110. Therefore, the device 102 may compare the first text characters to the second text characters, the first character styles to the second character styles and/or the first paragraph styles to the second paragraph styles. The device 102 may identify differences (e.g., errors) between the rendered text and the input text and may determine the source of the differences (e.g., the first text characters being different than the second text characters in a first paragraph, or the like). The device 102 may use tags or other flags to identify a source of the errors, such as by generating a tag associated with a first character from the first text characters that is different from a second character from the second text characters.

The device 102 may determine (126) confidence score(s). For example, the device 102 may determine an overall confidence score based on a number of errors detected after comparing the rendered input text to the input text, or a matching percentage calculated using the number of errors. Alternatively or additionally, the device 102 may determine multiple confidence scores, such as a first confidence score based on a number of errors detected comparing the first text characters to the second text characters, a second confidence score based on a number of errors detected comparing the first character styles to the second character styles and/or a third confidence score based on a number of errors detected comparing the first paragraph styles to the second paragraph styles. In some examples, the device 102 may perform the comparison on multiple pages, or every page, or some other portion of the electronic publication. The confidence score(s) may be part of a report listing the number of errors and potentially additional information associated with each of the number of errors. The report may identify specific errors, including a location of each error and whether the error involves text characters, character styles and/or paragraph styles. For example, the report may include an error identifying a margin as being an incorrect size on a specific page of the electronic publication. Therefore, debugging and troubleshooting may be enhanced with the additional information available in the report.

Finally, the device 102 may determine (128) that the confidence score(s) exceeds a threshold and may validate (130) the output rendering. Validating the output rendering indicates that the output rendering is substantially accurate based on the input data, with a margin of error allowing for minor variations or mistakes in the rendered output.

Various machine learning techniques may be used to compare characteristics between rendered data, to determine confidence score(s) as a result of such comparisons, or other determinations discussed herein. Such techniques may include, for example neural networks, inference engines, trained classifiers, etc. Examples of trained classifiers include Support Vector Machines (SVMs), neural networks, decision trees, AdaBoost (short for "Adaptive Boosting") combined with decision trees, and random forests.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including back propagation, statistical learning, supervised learning, semi-supervised learning, stochastic learning, or other known techniques. Many different training example utterances may be used during training.

Training examples of sample input data and rendered data, along with labeled ground truths about how examples compare, etc. may be used to training machine learning models for use at runtime to make such determinations.

Figure 2:
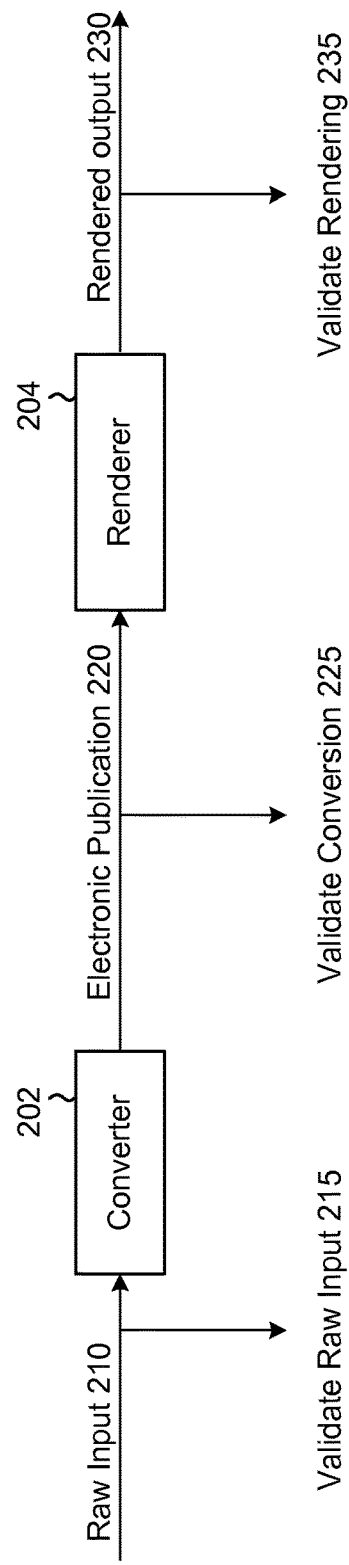
FIG. 2 illustrates an example system for ensuring a quality of an electronic publication.

FIG. 2 illustrates an example of ensuring a quality of an electronic publication. As illustrated in FIG. 2, an electronic publication 220 may be generated from raw input data 210 and may be displayed as a rendered output 230. For example, the raw input data 210 may be converted to the electronic publication 220 by a converter 202 and the electronic publication 220 may be rendered as the rendered output 230 by a renderer 204. To ensure the quality of the electronic publication, a system may validate (215) the raw input data 210, may validate (225) the conversion and may validate (235) the rendering. The system 100 illustrated in FIG. 1 is directed to validating the rendering in step 235, although the disclosure is not limited thereto. For example, validating the rendering may identify errors originating in the raw input data or the conversion. Traditionally, rendered output 230 may be sent to a display, and current comparison techniques may involve actually displaying the rendered output 230 and taking a picture of the display for use during comparing. The present system, however, does not require a display, and may not involve capturing image data with a camera (or similar image capture device) in order to perform the described comparing/validating.

To ensure a quality of a rendering for an electronic publication having a fixed layout, an output of the renderer 204 may be directly compared to an input to the renderer 204 and differences between the input and the output may be determined using image comparison techniques. However, some electronic publications have dynamic layouts that include reflowable content where the actual rendered data may vary based on a number of factors, including magnification, font size, margin size or the like. Therefore, the output of the renderer 204 cannot be compared to the input to the renderer 204 for situations involving dynamic layouts, as the layout itself changes. Thus, to ensure a quality of an electronic publication having a dynamic layout, the output of the renderer 204 may be captured using a camera or other imaging device and compared to an expected output, such as an output of a verified renderer or other techniques used to generate a reference rendering.

FIG. 3 illustrates an example flowchart of validating a rendering using a bitmap comparison. Typically, a prospective rendering is compared to a reference rendering using parity analysis or a bitmap comparison. This compares a single rendered image to a single reference image and determines if the rendered image is identical, or substantially similar, to the reference image. Thus, a device may capture (310) a first image of an output rendering, may receive (312) a second image of a reference rendering and may determine (314) differences between the first image and the second image. The device may determine (316) a comparison score between the output rendering and the reference rendering, may determine (318) that the comparison score exceeds a threshold and may validate (320) the output rendering. However, if errors exist and the device does not validate the output rendering, is it difficult to identify the errors without human involvement.

FIGS. 4A-4B illustrate examples of bitmap comparisons. As illustrated in FIG. 4A, a rendered display 400 may be compared to a reference display 402 to generate a first comparison 404. In this example, the first comparison 404 is aligned, meaning that the rendered display 400 matches the reference display 402 and the rendered display 400 is therefore validated. Similarly, as illustrated in FIG. 4B, a rendered display 410 may be compared to the reference display 402 to generate a second comparison 414. In this example, because the reference display 410 has a larger left margin, the second comparison 414 is not aligned, meaning that the rendered display 410 does not match the reference display 402. While the device may determine that the rendered display 410 does not match the reference display 402, the device cannot determine which errors resulted in the second comparison 414. For example, the system may not be able to determine if the bitmap error was cause by an increased margin, by actual errors in text conversion with one of the rendered displays, or due to some other reason.

Figure 5:
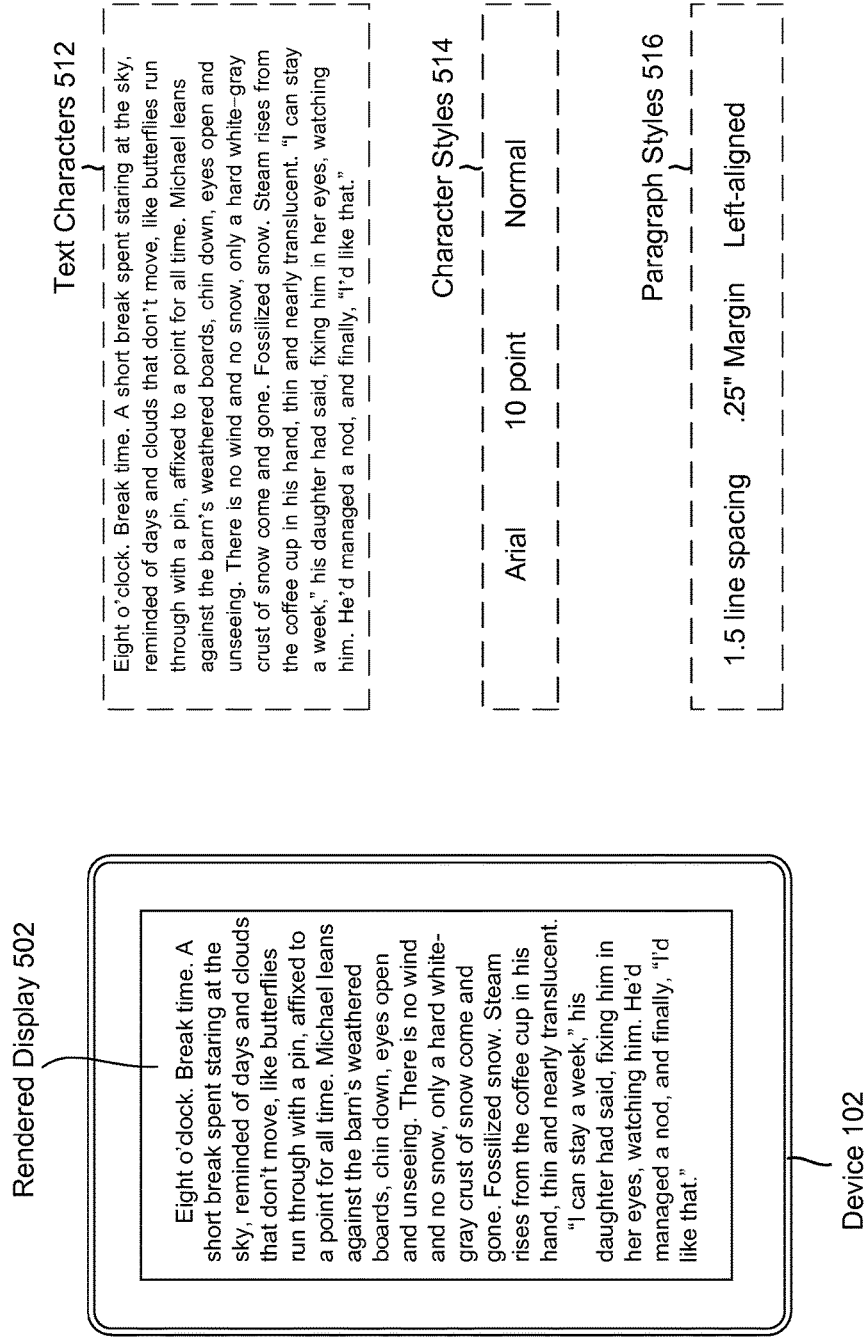
FIG. 5 illustrates an example of determining rendered text from a rendering according to embodiments of the present disclosure.

In contrast to comparing images in order to validate a rendering, the device 102 may generate an image (e.g., take a screenshot) of a rendered display, may extract rendered data from the rendered display, and may compare the rendered data to actual input data to the renderer. FIG. 5 illustrates an example of determining rendered data from a rendering according to embodiments of the present disclosure. As illustrated in FIG. 5, the rendered display 502 may be separated into various text attribute values, such as text characters 512, character styles 514 and paragraph styles 516. Examples of the text characters 512 may include a string of words displayed in the rendered display 502, such as the paragraph beginning with "Eight o'clock" illustrated in FIG. 5. Examples of character styles 514 may include font, formatting, size, bold, italic or the like, such as "Arial," "10 point" and "Normal" as illustrated in FIG. 5. Examples of paragraph styles 516 may include line spacing, margin, alignment or the like, such as "1.5 line spacing," "0.2 inch margin" and "Left-aligned" as illustrated in FIG. 5.

The device 102 may extract the rendered data from the rendered display using an Optical Character Recognition (OCR) engine (or similar technique) to determine the text characters 512, the character styles 514 and the paragraph styles 516. Typically, OCR engines are imprecise due to poor inputs, such as low quality images generated by capturing the rendering displayed on a device or scanning a printed page of a book. However, in the present system the device 102 may acquire high quality data by capturing the directly from an internal component configured to render data for the display 104. Thus the system may know certain information, such as a font family of the rendered data, prior to the OCR process. Thus, the OCR engine receives a high quality image, without distortion typically associated with scanning or image captures, and may also have access to other a priori data, such as a font for the rendered data from a limited font family, resulting in greater precision for the OCR output.

Figure 6:
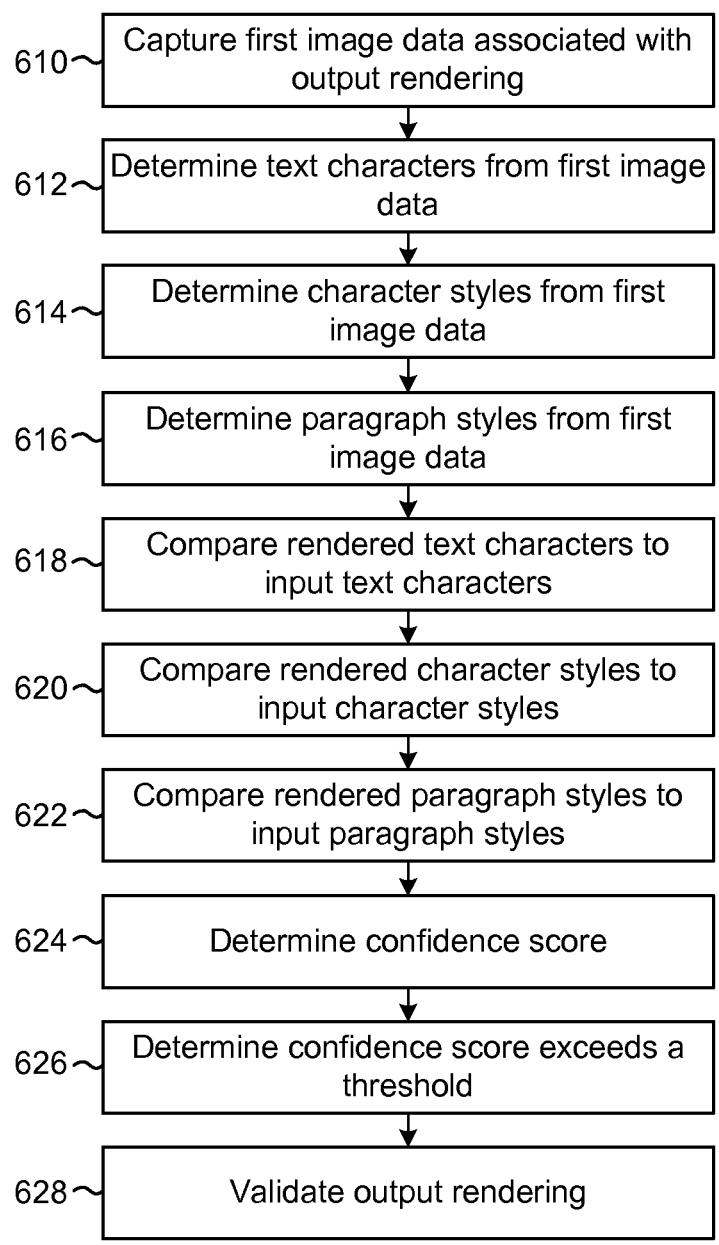
FIG. 6 is a flowchart conceptually illustrating an example method for validating a rendering by determining rendered test according to embodiments of the present disclosure.

FIG. 6 is a flowchart conceptually illustrating an example method for validating a rendering by determining rendered data according to embodiments of the present disclosure. The device 102 may capture (610) first image data associated with an output rendering. For example, the device 102 may extract the rendered display 502 displayed on the display 104 of the device 102.

In some examples, the device 102 may receive second image data from the renderer and may modify the second image data to generate the first image data. For example, the input data may include input text and graphical content and the renderer may render the input text and graphical content as the second image data. The second image data may be stored in a matrix buffer in the renderer and the device 102 may retrieve the second image data from the matrix buffer to display the second image data on the display 104. The matrix buffer may be a two-dimensional matrix of data including pixel values for each pixel in the second image data. The device 102 may not send the rendered data to a display. Thus, while rendered data prepared by the device 102 may be configured similarly to data that would be send to a display, the device 102/system 100 does require displaying of rendered data in order to perform the comparisons described herein.

The renderer may include a text layout engine and a graphic layout engine and the text layout engine may determine pixels associated with the input text. For example, the text layout engine may layout each word included in the input text and may determine a group of pixels associated with the layout for each word. The group of pixels associated with the layout for an individual word may form a block of pixels having a height of y pixels and a width of x pixels, such that the group of pixels may be identified from a beginning pixel (e.g., 0, y) associated with a top-left pixel to an end pixel (e.g., x, 0) associated with a bottom-right pixel.

The text layout engine may identify a paragraph of words in the input text and may determine a paragraph boundary identifying pixels associated with the layout for words included in the paragraph. For example, the input text may include a first paragraph and a second paragraph and the text layout engine may determine a first paragraph boundary and a second paragraph boundary.

To generate the first image data, the device 102 may retrieve the second image data from the matrix buffer and may determine a text boundary based on the paragraph boundaries associated with the second image data. For example, the device 102 may determine the text boundary to include the first paragraph boundary and the second paragraph boundary, such that that text boundary includes pixels associated with the layout of words included in the first paragraph and the second paragraph. The device 102 may generate the first image data by including portions of the second image data included in the text boundary. Thus, the device 102 may exclude graphical content included in the second image data outside of the text boundary from the first image data. The device 102 may format the first image data using various formats, such as portable network graphics (PNG) format or the like and may input the first image data to the OCR engine to extract the rendered input data. While the device 102 determines a resolution of the second image data based on a resolution of the display 104 in some examples, the present disclosure is not limited thereto. Instead, the device 102 may determine the resolution of the second image data based on a common resolution or may generate multiple outputs for multiple resolutions. In some examples, the display 104 may have a first resolution and the device 102 may generate rendered image data having a second resolution. In other examples, the display 104 may have the first resolution and the device 102 may generate rendered image data having a first resolution, a second resolution, a third resolution, etc. Thus, the device 102 may generate rendered image data associated with common resolutions, resolutions associated with popular mobile devices, and/or the like. For example, the device 102 may generate rendered image data for a plurality of displays at a plurality of resolutions without departing from the present disclosure. Therefore, the device 102 may validate rendering for multiple devices, operating at various resolutions and on various operating system (OS) platforms, such as FireOS®, Apple® iOS®, Android® OS, etc.

The device 102 may determine (612) text characters from the first image data using an OCR engine. Thus, the OCR engine may analyze the first image data and determine a string of characters, such as words, numbers and/or punctuation, which makes up a body of text displayed in the first image data (and therefore output rendering). For example, the OCR engine may analyze the rendered display 504 and determine text characters 512, as illustrated in FIG. 5.

The device 102 may determine (614) character styles from the first image data using the OCR engine. Thus, the OCR engine may analyze the first image data and determine font, formatting, size, style or the like. For example, the text characters may be displayed using a particular font (e.g., a specific font from a font family), a size of the font (e.g., a size of text, such as 12 point font), and/or a style of font (e.g., italic, bold, superscript, subscript, etc.), and the OCR engine may analyze the rendered display 504 and determine the character styles 514 as illustrated in FIG. 5.

The device 102 may determine (616) paragraph styles from the first image data using the OCR engine. Thus, the OCR engine may analyze the first image data and determine line spacing, margins, alignment or the like. For example, the text characters may be displayed using line spacing (e.g., 1.5 line spacing), margins (e.g., 0.2" margins), and an alignment (e.g., left aligned), and the OCR engine may analyze the rendered display 504 and determine the paragraph styles 516 as illustrated in FIG. 5.

The device 102 may compare (618) the rendered text characters to input text characters. For example, the device 102 may compare the text characters 512 to the input text characters used to generate the rendered display 502. The device 102 may detect a difference between the rendered text characters and the input text characters, determine a location associated with the difference and save the difference and the location as an error. The location may be determined from a beginning of the rendered text characters and/or the input text characters based on a number of characters, words, sentences or the like. For example, the location in the rendered text characters may be a number of characters from the beginning of the rendered text characters. The device 102 may compare (620) the rendered character styles to input character styles. For example, the device 102 may compare the character styles 514 to the input character styles used to generate the rendered display 502. The device 102 may detect a difference between the rendered character styles and the input character styles, determine a location associated with the difference and save the difference and the location as an error. The device 102 may compare (622) the rendered paragraph styles to input paragraph styles. For example, the device 102 may compare the paragraph styles 516 to the input paragraph styles used to generate the rendered display 502. The device 102 may detect a difference between the rendered paragraph styles and the input paragraph styles, determine a location associated with the difference and save the difference and the location as an error.

The device 102 may determine (624) confidence score(s) based on the previous comparisons. For example, the device 102 may determine an overall confidence score based on a number of errors detected comparing the rendered text characters to the input text characters, the rendered character styles to the input character styles and the rendered paragraph styles to the input paragraph styles. Alternatively or additionally, the device 102 may determine an overall confidence score based on a percentage of matching, such as a percentage of the rendered text characters, rendered character styles and/or the rendered paragraph styles matching the input text characters, the input character styles and/or the input paragraph styles. The device 102 may instead determine individual confidence scores, such as a first confidence score based on a number of errors detected comparing the rendered text characters to the input text characters, a second confidence score based on a number of errors detected comparing the rendered character styles to the input character styles and/or a third confidence score based on a number of errors detected comparing the rendered paragraph styles to the input paragraph styles. In some examples, the device 102 may perform the comparison on multiple pages, or every page, of the electronic publication. The confidence score(s) may be part of a report listing the number of errors and potentially additional information associated with each of the number of errors. For example, the report may list an error and a location of the error, along with supplemental information such as the corresponding rendered data and the corresponding input data. The report may identify specific errors, including a location of each error and whether the error involves text characters, character styles and/or paragraph styles. For example, the report may include an error identifying a margin as being an incorrect size on a specific page of the electronic publication. Therefore, debugging and troubleshooting may be enhanced with the additional information available in the report.

The device 102 may determine (626) that the confidence score(s) exceed a threshold and may validate (628) the output rendering. Validating the output rendering indicates that the output rendering is substantially accurate based on the input data, with a margin of error allowing for minor variations or mistakes in the rendered output. The margin of error may be based on the threshold used to validate the rendering, with a lower threshold corresponding to a larger margin of error and a higher threshold corresponding to a lower margin of error. In some examples, individual thresholds may be used for each comparison to generate the confidence score(s). For example, a first comparison associated with text characters may have a first threshold, a second comparison associated with character styles may have a second threshold, and a third comparison associated with paragraph styles may have a third threshold.

Instead of or in addition to having a first confidence score grouping comparisons involving text characters, a second confidence score grouping comparisons involving character styles and a third confidence score grouping comparisons involving paragraph styles, the device 102 may generate additional confidence scores to provide additional detail and/or quality assurance. For example, the device 102 may generate multiple confidence scores for comparisons involving text characters (e.g., substitutions, deletions and insertions, resulting in three separate confidence scores), multiple confidence scores for comparisons involving character styles (e.g., font type, font size, font style, or the like, resulting in three or more separate confidence scores) and multiple confidence scores for comparisons involving paragraph styles (e.g., line spacing, margin size, paragraph configuration or the like, resulting in three or more separate confidence scores). As discussed above, each confidence score may have a unique threshold depending on the comparisons involved.

If the first comparison has a number of errors below the first threshold, a first confidence score may be a value of "1" to signify that the first comparison passes. If the first comparison has a number of errors above the first threshold, the first confidence score may be a value of "0" to signify that the first comparison fails. An overall confidence score may have a value of "1" if each of the confidence score(s) have a value of "1," signifying that the overall rendering passes inspection, and may have a value of "0" if any of the confidence score(s) have a value of "0," signifying that one of the comparisons failed the inspection.

Thresholds may be determined autonomously based on fixed percentages of accuracy (e.g., within a 5% margin of error) or may be determined based on a continuous accumulation of data from user input. For example, user(s) may provide feedback to adjust the thresholds in order to train the system. As an example of providing feedback, a user may review a list of errors to determine whether each of the errors affect an overall quality or readability of the rendering. Thus, small errors that may be easily ignored by a reader (e.g., minor character substitution or minute differences in margins) may have a higher threshold for "passing inspection," whereas large errors that affect readability (e.g., incorrect margins showing a single word on each line) may have a lower threshold for "passing inspection." Therefore, a quality of rendering may be maintained without rejecting the rendering for minor mistakes that are not noticeable to a reader.

The device 102 may detect three types of errors; substitution, insertion and deletion. Substitution errors occur when the OCR engine predicts an incorrect input instead of the actual input, such as predicting "on" in place of "an" in the actual input. Insertion errors occur when the OCR engine predicts an incorrect input that is not present in the actual input, such as predicting "an" in place of "a" in the actual input. Deletion errors occur when the OCR engine fails to predict the actual input, such as predicting "a" in place of "an" in the actual input. While these examples illustrate errors including a single character, the OCR engine may substitute, insert or delete entire words or strings of words. However, as the device 102 may know a font family used for the electronic publication, the OCR engine may be more reliable with a high accuracy.

To further make the comparison robust, the device 102 may allow for minor differences in the property values, such as values for the text characters, character styles or paragraph styles. Thus, the device 102 may smooth the property values over a running sample of the content. For example, when comparing against font size for a particular word, the device 102 may use data from neighboring words to smooth out the values (e.g., font sizes) and maintain uniform predictions. Neighboring words may include adjacent words or words in proximity within a sentence and/or paragraph. In addition, the device 102 may compare font size between neighboring characters (e.g., adjacent characters within a word, characters in proximity within a sentence and/or paragraph or the like) using similar techniques as illustrated with respect to neighboring words.

The device 102 may make an assumption that neighboring words have identical character styles, such as the same font, font size or the like. Thus, the device 102 may determine the character styles for every word or character and smooth using the running sample of the content. For example, the device 102 may determine a first character style value for a first character, a second character style value for a second character and a third character style value for a third character and may determine an overall character style for the first character, the second character and the third character by determining a mode of the first character style value, the second character style value and the third character style value. Thus, minor variations in character values are ignored and a most commonly used character style is substituted for character styles that are substantially similar. Alternatively or additionally, the device 102 may determine the character styles for certain words or characters to get a broad map of the character styles before determining the character styles for individual words or characters. For example, if the device 102 determines that each of the certain words have the same character styles, the device 102 may assume that intervening words share the same character styles as well. In these examples, differences within a certain threshold, such as 10% or less, are considered to be substantially similar character styles. However, if the device 102 determines that character styles between each of the certain words are substantially different, the device 102 may determine the character styles for each of the intervening words.

As discussed above, the accuracy of the OCR engine is improved as a result of using a screenshot from the device 102 instead of capturing the rendered display using an external camera or scanner. Therefore, the rendered images are extremely controlled with higher quality inputs to the OCR engine. This reduces distortion or other image degradation resulting from obtaining images from the camera/scanner. In addition, an accuracy of the OCR engine is improved as a result of the OCR engine knowing the font family used by the renderer to generate the rendered display. Thus, as the OCR engine knows the font family used to render, and in some cases a particular font used to render, the OCR engine may be customized or specifically trained on that font/font family.

To ensure a quality of an electronic publication, the method corresponding to the flowchart illustrated in FIG. 6 may be performed prior to the electronic publication being available to the public. For example, the device 102 may be included in a pre-publication process to validate the electronic publication during a preparation stage. However, the disclosure is not limited thereto, and the method corresponding to the flowchart illustrated in FIG. 6 may be performed after the electronic publication is available to the public. For example, the device 102 may be an electronic reader or other consumer device that may validate each page of the electronic publication as the page is rendered. The device 102 may report errors or other invalid renderings to a remote server for further testing to improve future rendering.

In some examples, the method corresponding to FIG. 6 may be performed to validate rendering engines developed independently. For example, an independent organization or programmer may develop a rendering engine and may wish to display electronic publications using the rendering engine. To validate the rendering engine, the independent organization may use the device 102 to determine if the rendering engine renders electronic publications accurately. In first examples, the independent organization may receive first input data from the device 102, may render the first input data to generate first rendered image data and may transmit the first rendered image data to the device 102. By comparing the first rendered image data received by the device 102 to the first input data known to the device 102, the device 102 may validate the rendering engine. In second examples, the independent organization may render second input data to generate second rendered image data and may transmit the second input data and the second rendered image data to the device 102. By comparing the second rendered image data to the second input data the device 102 may validate the rendering engine.

Figure 7A:
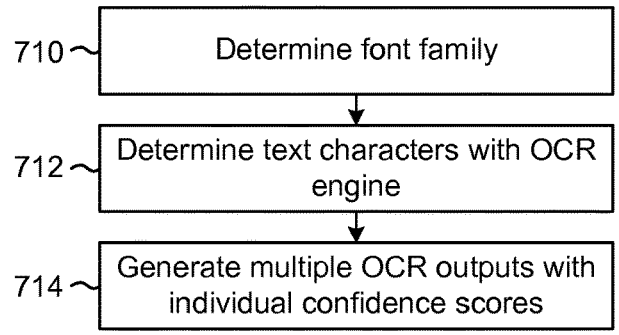
FIGS. 7A-7C are flowcharts conceptually illustrating example methods for determining rendered character text and comparing the rendered character text to input character text according to embodiments of the present disclosure.
Figure 7B:
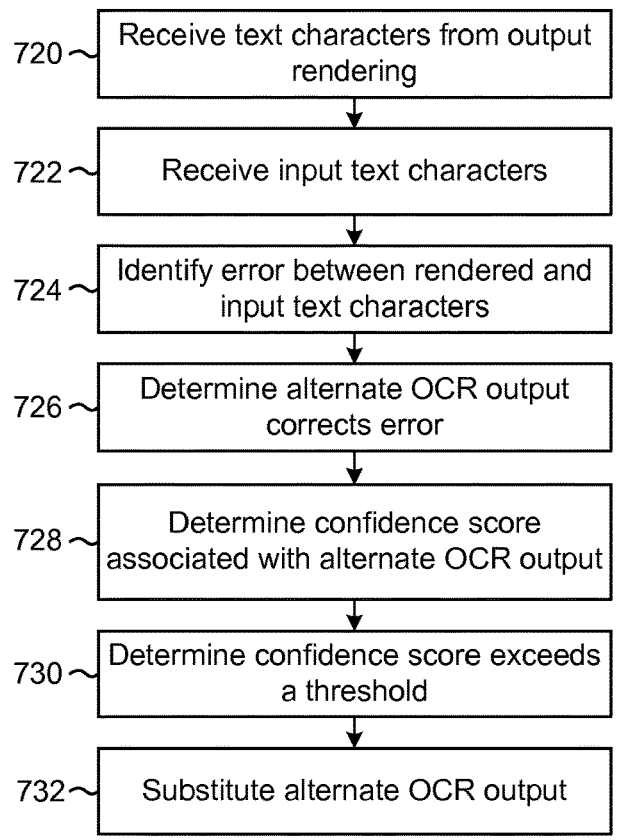
Figure 7C:
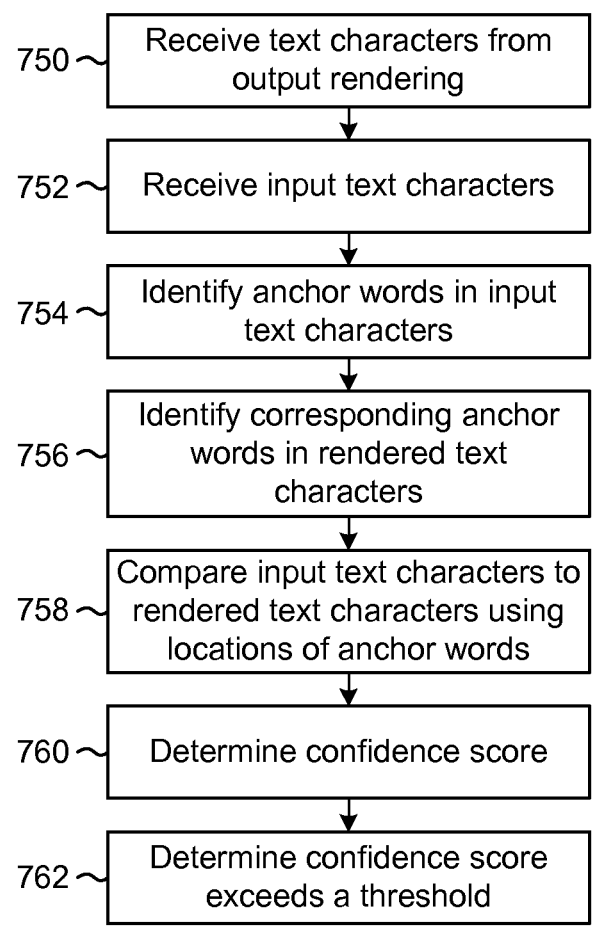

FIGS. 7A-7C are flowcharts conceptually illustrating example methods for determining rendered character text and comparing the rendered character text to input character text according to embodiments of the present disclosure. As illustrated in FIG. 7A, the device 102 may determine (710) a font family used in the electronic publication. For example, the device 102 may detect the font family from the electronic publication or may be programmed to know the font family of the electronic publication to improve a result of the OCR engine.

The device 102 may determine (712) text characters using an OCR engine and may generate (714) multiple OCR outputs with individual confidence scores. For example, the OCR engine may generate a first OCR output (e.g., "Using on example") with a first confidence score and may generate a second OCR output (e.g., "Using an example") with a second confidence score. Thus, the OCR engine may generate multiple OCR outputs allowing for minor variations in individual letters or word substitutions without departing from the general OCR output. An example is described in greater detail below with regard to FIG. 7B.

As illustrated in FIG. 7B, the device 102 may receive (720) text characters from the output rendering and may receive (722) input text characters that were input to the renderer. The device 102 may identify (724) an error between the rendered text characters and the input text characters. For example, the device 102 may identify that the rendered text characters include a first word string (e.g., "Using on example") whereas the input text characters include a second word string (e.g., "Using an example"). The device 102 may determine (726) that an alternate OCR output corrects the error. For example, the device 102 may determine that the second OCR output includes the second word string (e.g., "Using an example"). The device 102 may determine (728) a confidence score associated with the alternate OCR output, may determine (730) that the confidence score exceeds a threshold and may substitute (732) the alternate OCR output. Thus, the device 102 may substitute the second OCR output for the first OCR output and continue the comparison between the rendered text characters to the input text characters.

As part of comparing a first rendered word string to a second input word string, the device 102 may identify anchor words within the input word string, may determine first locations of the anchor words in the rendered word string and second locations of the anchor words in the input word string, and may compare the first locations to the second locations. The first locations may be determined from a beginning of the rendered word string and the second locations may be determined from a beginning of the input word string based on a number of characters, words, sentences or the like. For example, one of the second locations in the rendered word string may be a number of characters from the beginning of the rendered word string. An "anchor" word is a reference word in a word string that may be used for comparing locations of other words as described herein. The selected anchor word may be a word that occurs less frequently in processed text (i.e., occurs with a frequency less than a word frequency threshold), so that the word may be used as a reference point in the text. Thus the anchor word may provide a reference location in the text for performing certain checks/comparisons in the rendered text. If the first locations match the second locations above a threshold, the device 102 may determine that the first rendered word string matches the second input word string.

As illustrated in FIG. 7C, the device 102 may receive (750) text characters from the output rendering and may receive (752) input text characters that were input to the renderer. The device 102 may identify (754) anchor words in the input text characters and identify (756) the corresponding anchor words in the rendered text characters. The device 102 may compare (758) the input text characters to the rendered text characters using locations of the anchor words. The device 102 may determine (760) a confidence score between the input text characters and the rendered text characters using the comparison and determine (762) that the confidence score exceeds a threshold.

As an alternative, the device 102 may use anchor words for alignment, breaking a string of text characters into smaller segments for comparison. For example, the device 102 may identify anchor words as discussed above, but instead of comparing the locations of the anchor words in the input text characters and the rendered text characters, the device 102 may use the locations of the anchor words to segment the input text characters and the rendered text characters. Thus, the device 102 may break a string of characters into a first segment and a second segment using a first anchor word, and compare each character in the first segment of input text characters to each character in the first segment of rendered text characters.

After a first step of segmenting using anchor words, the device 102 may identify additional anchor words in each segment and recursively break apart the segments to reduce a number of characters to compare at a time. For example, the device 102 may determine three anchor words in a paragraph, the three anchor words being most unique of the words in the paragraph, and separate the paragraph into four segments of words. The device 102 may then determine an anchor word in each of the four segments of words, separating the paragraph into eight segments of words. The device 102 may continue identifying anchor words until each segment is below a threshold of characters or the device 102 cannot identify a suitable anchor word. As a result of segmenting the word strings, the device 102 may more accurately compare text characters between the input text characters and the rendered text characters even if insertion or deletion occurs. For example, inserting or deleting a string of characters may result in a mismatch between the input text characters and the rendered text characters, which may result in errors for subsequent comparisons. Breaking the string of characters into segments may reduce the number of comparisons affected. Therefore, segmenting the word strings using anchor words allows the device 102 to more easily identify insertions and deletions and may improve an accuracy of comparing corresponding characters.

Figure 8:
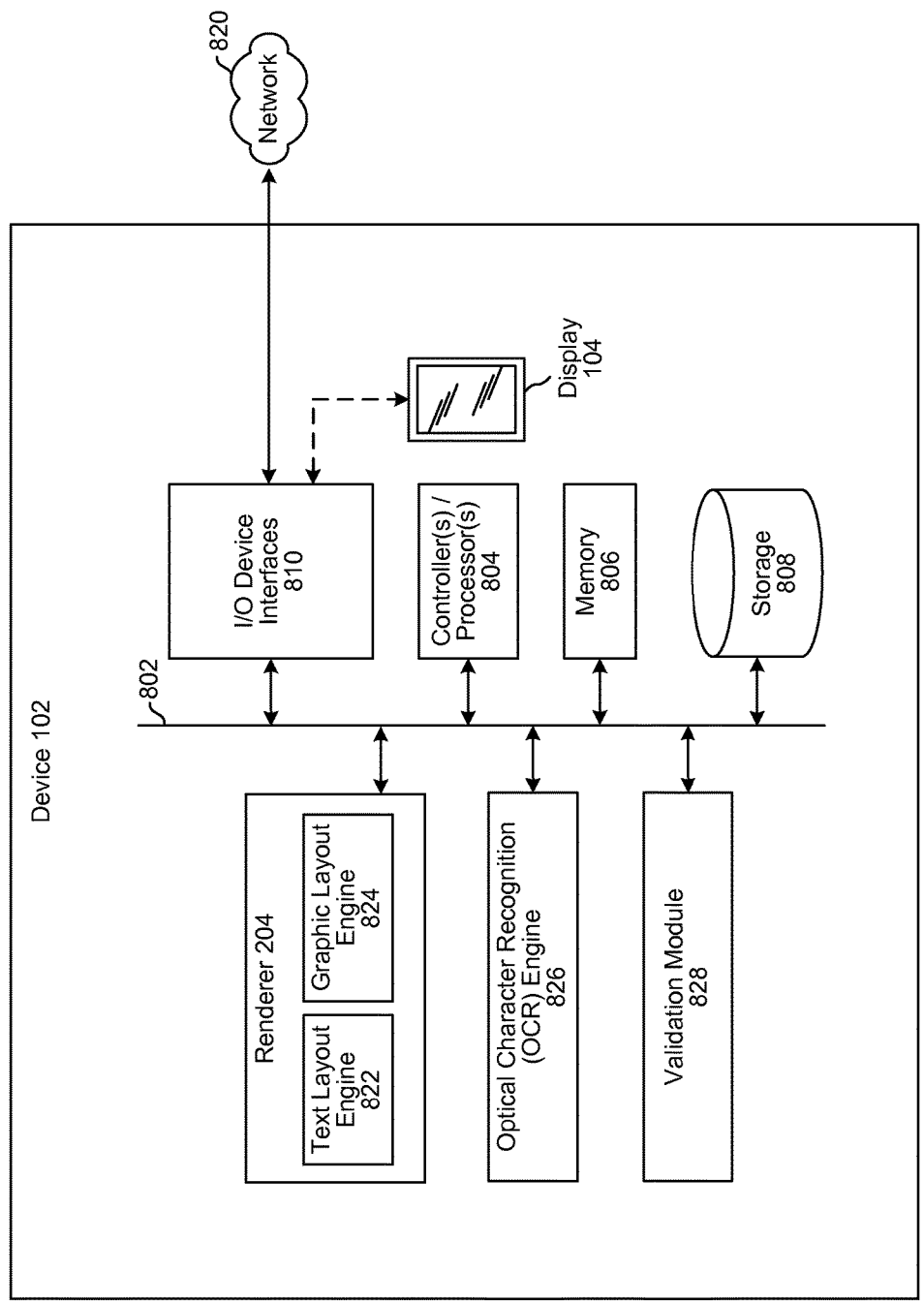
FIG. 8 is a block diagram conceptually illustrating example components of a system according to embodiments of the present disclosure.

FIG. 8 illustrates a block diagram conceptually illustrating example components of a system including a computing device 102. Other components not illustrated may also be included in the device 102. In operation, the system may include computer-readable and computer-executable instructions that reside in storage 808 on the device 102. The device 102 may be an electronic device capable of displaying images. Examples of electronic devices may include computers (e.g., a desktop, a laptop, a server or the like), portable devices (e.g., an electronic reader, smart phone, tablet, smart watch or the like) or the like. The device 102 may also be a component of any of the abovementioned devices or systems.

As illustrated in FIG. 8, the device 102 may include an address/data bus 802 for conveying data among components of the computing device 102. Each component within the computing device 102 may also be directly connected to other components in addition to (or instead of) being connected to other components across the bus 802.

The computing device 102 may include one or more controllers/processors 804 comprising one-or-more central processing units (CPUs) for processing data and computer-readable instructions and a memory 806 for storing data and instructions. The memory 806 may include volatile random access memory (RAM), non-volatile read only memory (ROM), non-volatile magnetoresistive (MRAM) and/or other types of memory. The device 102 may also include a data storage component 808 for storing data and processor-executable instructions. The data storage component 808 may include one or more non-volatile storage types such as magnetic storage, optical storage, solid-state storage, etc. The device 102 may also be connected to a removable or external non-volatile memory and/or storage (such as a removable memory card, memory key drive, networked storage, etc.) through the input/output device interfaces 810. The input/output device interfaces 810 may be configured to operate with a network 820, for example a wireless local area network (WLAN) (such as WiFi), Bluetooth, zigbee and/or wireless networks, such as a Long Term Evolution (LTE) network, WiMAX network, 3G network, etc. The network 820 may include a local or private network or may include a wide network such as the internet. Devices may be connected to the network 820 through either wired or wireless connections.

The device 102 includes input/output device interfaces 810. A variety of components may be connected through the input/output device interfaces 810, such as the display or display screen 104, which may have a touch surface or touchscreen. However, the disclosure is not limited thereto and the device 102 may not include an integrated touchscreen or display 104. Thus, the display 104 and other components may be integrated into the device 102 or may be separate without departing from the disclosure.

The display 104 may be a video output device for displaying images. The display 104 may be a display of any suitable technology, such as a liquid crystal display, an organic light emitting diode display, electrophoretic display, electrowetting display, an electrochromic display, a cathode ray tube display, a pico projector or other suitable component(s). The display 104 may also be implemented as a touchscreen and may include components such as electrodes and/or antennae for use in detecting stylus input events or detecting when a stylus is hovering above, but not touching, the display 104.

The input/output device interfaces 810 may also include an interface for an external peripheral device connection such as universal serial bus (USB), FireWire, Thunderbolt, Ethernet port or other connection protocol that may connect to networks 820. The input/output device interfaces 810 may also include a connection to an antenna (not shown) to connect one or more networks 820 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The device 102 further includes a renderer 204, an Optical Character Recognition (OCR) engine 826 and a validation module 828, which may comprise processor-executable instructions stored in storage 808 to be executed by controller(s)/processor(s) 804 (e.g., software, firmware), hardware, or some combination thereof. For example, components of the renderer 204, the OCR engine 826 and/or the validation module 828 may be part of a software application running in the foreground and/or background on the device 102. The renderer 204, the OCR engine 826 and/or the validation module 828 may control the device 102 as discussed above, for example with regard to FIGS. 1, 6, and/or 7A-7C. The renderer 204 may include a text layout engine 822 and a graphic layout engine 824 and may be used to generate display data. For example, the renderer 204 may receive input data including input text and input graphical content and may generate an output image using the text layout engine 822 to generate a layout for the input text and the graphic layout engine 824 to generate a layout for the graphical content. The output image may be configured for display on a display of the device 102, although the present disclosure is not limited thereto and the output image may be configured for external displays or for desired resolutions. The OCR engine 826 may be used to determine text characters, character styles and paragraph styles included in an image. Some or all of the controllers/modules of the renderer 204, the OCR engine 826 and/or the validation module 828 may be executable instructions that may be embedded in hardware or firmware in addition to, or instead of, software. In one embodiment, the computing device 102 may operate using an operating system, such as Amazon's FireOS® operating system.

Executable instructions for operating the device 102 and its various components may be executed by the controller(s)/processor(s) 804, using the memory 806 as temporary "working" storage at runtime. The executable instructions may be stored in a non-transitory manner in non-volatile memory 806, storage 808, or an external device. Alternatively, some or all of the executable instructions may be embedded in hardware or firmware in addition to or instead of software.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

The concepts disclosed herein may be applied within a number of different devices and computer systems, including, for example, general-purpose computing systems, televisions, stereos, radios, server-client computing systems, mainframe computing systems, telephone computing systems, laptop computers, cellular phones, personal digital assistants (PDAs), tablet computers, wearable computing devices (watches, glasses, etc.), other mobile devices, etc.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware and/or hardware. Further, the teachings of the disclosure may be performed by an application specific integrated circuit (ASIC), field programmable gate array (FPGA), or other component, for example.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method of determining errors in the output of a rendering component for an electronic device, the method comprising:
    receiving input data to be displayed on an electronic reader device, wherein the input data represents input text and graphical content;
    rendering, using the input data, first image data, wherein the first image data includes the input text and the graphical content;
    determining a text boundary within the first image data, wherein the text boundary include the input text;
    determining second image data from the first image data, the second image data including portions of the first image data within the text boundary and formatted in portable network graphics format, wherein the second image data includes the input text and excludes the graphical content;
    determining first rendered text from the second image data using an optical character recognition (OCR) engine;
    generating a first comparison by comparing the first rendered text to the input text, wherein generating the first comparison comprises:
        determining a first number of differences in text attribute values between the first rendered text and the input text, the text attribute values associated with at least one of a text character, font type or paragraph type,
        determining that the first number of differences is below a first threshold, indicating that the first rendered text is similar to the input text, and
        determining a first confidence value that the first image data corresponds to the input text;
    determining that the first confidence value is above a text similarity threshold; and
    validating the first image data based on the first confidence value exceeding the text similarity threshold.

2. The computer-implemented method of claim 1, wherein the rendering further comprises:
    determining a first resolution associated with a display of the electronic reader device;
    generating the first image data using the first resolution;
    storing the first image data in a buffer;
    determining a first paragraph boundary, wherein the first paragraph boundary includes pixels in the first image data associated with a first paragraph of the input text;
    determining a second paragraph boundary, wherein the second paragraph boundary includes pixels in the first image data associated with a second paragraph of the input text; and
    displaying the first image data on the display,
wherein determining the text boundary further comprises:
    determining the text boundary within the first image data using the first paragraph boundary and the second paragraph boundary, wherein the text boundary includes the pixels in the first image data associated with the first paragraph of the input text and the second paragraph of the input text, and
determining the second image data further comprises:
    receiving the first image data from the buffer; and
    determining the second image data from the first image data using the text boundary.

3. The computer-implemented method of claim 1, further comprising:
    determining a first confidence score associated with the first rendered text;
    determining second rendered text from the second image data using the OCR engine, wherein the second rendered text:
        is different than the first rendered text, and
        is associated with a second confidence score above a threshold but lower than the first confidence score;
    determining a first error in the first number of differences, wherein the first error is a difference in text attribute values between the first rendered text and the input text;
    generating a second comparison by comparing the second rendered text to the input text, wherein generating the second comparison comprises determining a second number of differences in text attribute values between the second rendered text and the input text;

determining, using the second comparison, that the second rendered text resolves the first error; and substituting the second rendered text for the first rendered text as output from the OCR engine.

4. The computer-implemented method of claim 1, further comprising:

determining an anchor word in the input text, wherein the anchor word occurs in the input text with a frequency below a word frequency threshold;

determining a first location of the anchor word in the input text, wherein the first location indicates a number of characters from a beginning of the input text to the first location;

determining a second location of the anchor word in the first rendered text, wherein the second location indicates a number of characters from a beginning of the first rendered text to the anchor word;

comparing the first location to the second location in a second comparison; and determining that a second confidence value associated with the second comparison exceeds an anchor similarity threshold.

5. A computer-implemented method, the method comprising:

receiving electronic input text data representing input text;

rendering, using the electronic input text data, first image data associated with an electronic publication having a dynamic layout;

determining a text boundary associated with the first image data, wherein the text boundary includes pixels associated with the input text;

determining second image data from the first image data using the text boundary, the second image data including portions of the first image data within the text boundary;

determining electronic rendered text data from the second image data using an optical character recognition (OCR) engine, wherein the electronic rendered text data represents rendered text that corresponds to the input text;

determining a difference between the electronic rendered text data and the electronic input text data; and determining the difference is below a threshold.

6. The computer-implemented method of claim 5, wherein the determining the electronic rendered text data further comprises:

determining a first character style value of a first character included in the second image data, the first character style output by the OCR engine;

determining a second character style value of a second character following the first character;

determining a third character style value of a third character following the second character;

determining a fourth character style value using the first character style value, the second character style value and the third character style value; and determining the rendered text, wherein the electronic rendered text data includes the fourth character style value for the first character, the second character, and the third character.

7. The computer-implemented method of claim 5, further comprising:

determining first rendered text characters from the image data using the OCR engine;

determining a first confidence score associated with the first rendered text characters;

determining second rendered text characters from the image data using the OCR engine, wherein the second rendered text characters are different than the first rendered text characters;

determining a second confidence score associated with the second rendered text characters, the second confidence score being lower than the first confidence score;

determining a first error, wherein the first error is a text character value difference between the first rendered text characters and the input text;

generating a second comparison by comparing the second rendered text characters to the input text; and determining, using the second comparison, that the second rendered text characters resolves the first error, wherein the determining the electronic rendered text data further comprises:

determining the electronic rendered text data, wherein the electronic rendered text data includes the second rendered text characters.

8. The computer-implemented method of claim 5, wherein determining that the electronic rendered text data is similar to the electronic input text data further comprises:

determining a first error between rendered text characters from the electronic rendered text data to input text characters from the electronic input text data, determining a second error between rendered character styles from the electronic rendered text data to input character styles from the electronic input text data, and determining a third error between rendered paragraph styles from the electronic rendered text data to input paragraph styles from the electronic input text data, and wherein the method further comprises:

generating an error report, the error report including at least one of the first error and a location of the first error, the second error and a location of the second error and the third error and a location of the third error, wherein the location of the first error indicates a number of characters from a beginning of the electronic input text data to the first error.

9. The computer-implemented method of claim 5, further comprising:

determining an anchor word in the input text;

determining a first location of the anchor word in the input text, wherein the first location indicates a number of characters from a beginning of the input text to the first location;

determining a second location of the anchor word in the rendered text, wherein the second location indicates a number of characters from a beginning of the electronic rendered text data to the second location; and comparing the first location to the second location, wherein determining that the electronic rendered text data is similar to the electronic input text data further comprises:

determining that the electronic rendered text data is similar to the electronic input text data based on the comparison of the first location to the second location.

10. The computer-implemented method of claim 5, wherein the rendering further comprises:

determining a first resolution associated with a display;

generating the first image data using the first resolution;

storing the first image data in a buffer;

determining a first paragraph boundary, wherein the first paragraph boundary includes pixels in the first image data associated with a first paragraph of the input text;

determining a second paragraph boundary, wherein the second paragraph boundary includes pixels in the first image data associated with a second paragraph of the input text; and displaying the first image data on the display, wherein determining the text boundary further comprises:

determining the text boundary within the first image data using the first paragraph boundary and the second paragraph boundary, wherein the text boundary includes the pixels in the first image data associated with the first paragraph of the input text and the second paragraph of the input text, and determining the second image data further comprises:

receiving the first image data from the buffer; and determining the second image data from the first image data using the text boundary.

11. The computer-implemented method of claim 5, wherein receiving the electronic input text data further comprises:

receiving the electronic input text data, wherein the electronic input text data comprises an input character style including at least one of an input font type, an input font size and an input font style, wherein determining the electronic rendered text data further comprises:

determining the electronic rendered text data from the second image data using the OCR engine, wherein the electronic rendered text data comprises a rendered character style including at least one of a rendered font type, a rendered font size and a rendered font style, and wherein determining that the electronic rendered text data is similar to the electronic input text data further comprises:

generating a first comparison, the first comparison comparing at least one of:

the input font type to the rendered font type, the input font size to the rendered font size, or the input font style to the rendered font style; and determining that the electronic rendered text data is similar to the electronic input text data based on the first comparison.

12. The computer-implemented method of claim 5, further comprising:

determining a first resolution associated with a first device;

generating the first image data using the first resolution;

determining a first paragraph boundary, wherein the first paragraph boundary includes pixels in the first image data associated with a first paragraph of the input text;

determining a second paragraph boundary, wherein the second paragraph boundary includes pixels in the first image data associated with a second paragraph of the input text;

determining a second resolution associated with a second device;

generating third image data using the second resolution;

determining a third paragraph boundary, wherein the third paragraph boundary includes pixels in the third image data associated with the first paragraph of the input text; and determining a fourth paragraph boundary, wherein the fourth paragraph boundary includes pixels in the third image data associated with the second paragraph of the input text.

13. The computer-implemented method of claim 5, wherein the memory further comprises instructions that, when executed by the at least one processor, further cause the device to:

receive the electronic input text data, wherein the electronic input text data comprises an input character style including at least one of an input font type, an input font size and an input font style;

determine the electronic rendered text data from the second image data using the OCR engine, wherein the electronic rendered text data comprises a rendered character style including at least one of a rendered font type, a rendered font size and a rendered font style;

generate a first comparison, the first comparison comparing at least one of:

the input font type to the rendered font type, the input font size to the rendered font size, or the input font style to the rendered font style; and determine that the electronic rendered text data is similar to the electronic input text data based on the first comparison.

14. The computer-implemented method of claim 5, wherein the memory further comprises instructions that, when executed by the at least one processor, further cause the device to:

determine a first resolution associated with a first device;

generate the first image data using the first resolution;

determine a first paragraph boundary, wherein the first paragraph boundary includes pixels in the first image data associated with a first paragraph of the input text;

determine a second paragraph boundary, wherein the second paragraph boundary includes pixels in the first image data associated with a second paragraph of the input text;

determine a second resolution associated with a second device;

generate third image data using the second resolution;

determine a third paragraph boundary, wherein the third paragraph boundary includes pixels in the third image data associated with the first paragraph of the input text; and determine a fourth paragraph boundary, wherein the fourth paragraph boundary includes pixels in the third image data associated with the second paragraph of the input text.

15. The computer-implemented method of claim 5, wherein:

the electronic input text data comprises an input character style including at least one of an input font type, an input font size and an input font style, and the electronic rendered text data comprises a rendered character style including at least one of a rendered font type, a rendered font size and a rendered font style.

16. A device, comprising:

at least one processor;

memory including instructions operable to be executed by the at least one processor to perform a set of actions to cause the device to:

receive electronic input text data representing input text;

render, using the electronic input text data, first image data associated with an electronic publication having a dynamic layout;

determine a text boundary associated with the first image data, wherein the text boundary includes pixels associated with the input text;

determine second image data from the first image data using the text boundary, the second image data including portions of the first image data within the text boundary;

determine electronic rendered text data from the second image data using an optical character recognition (OCR) engine, wherein the electronic rendered text data represents rendered text that corresponds to the input text;

determine a difference between the electronic rendered text data and the electronic input text data; and determine the difference is below a threshold.

17. The device of claim 16, wherein the memory further comprises instructions that, when executed by the at least one processor, further cause the device to:

determine a first character style value of a first character included in the second image data, the first character style output by the OCR engine;

determine a second character style value of a second character following the first character;

determine a third character style value of a third character following the second character;

determine a fourth character style value using the first character style value, the second character style value and the third character style value; and determine the electronic rendered text data, wherein the electronic rendered text data includes the fourth character style for the first character, the second character, and the third character.

18. The device of claim 16, wherein the memory further comprises instructions that, when executed by the at least one processor, further cause the device to:

determine first rendered text characters from the image data using the OCR engine;

determine a first confidence score associated with the first rendered text characters;

determine second rendered text characters from the image data using the OCR engine, wherein the second rendered text characters are different than the first rendered text characters;

determine a second confidence score associated with the second rendered text characters, the second confidence score being lower than the first confidence score;

determine a first error, wherein the first error is a text character value difference between the first rendered text characters and the input text;

generate a second comparison by comparing the second rendered text characters to the input text;

determine, using the second comparison, that the second rendered text characters resolves the first error; and determine the electronic rendered text data, wherein the electronic rendered text data includes the second rendered text characters.

19. The device of claim 16, wherein the memory further comprises instructions that, when executed by the at least one processor, further cause the device to:

determine a first error between rendered text characters from the electronic rendered text data to input text characters from the electronic input text data;

determine a second error between rendered character styles from the electronic rendered text data to input character styles from the electronic input text data;

determine a third error between rendered paragraph styles from the electronic rendered text data to input paragraph styles from the electronic input text data; and generate an error report, the error report including at least one of the first error and a location of the first error, the second error and a location of the second error and the third error and a location of the third error, wherein the location of the first error indicates a number of characters from a beginning of the electronic input text data to the first error.

20. The device of claim 16, wherein the memory further comprises instructions that, when executed by the at least one processor, further cause the device to:

determine an anchor word in the input text;

determine a first location of the anchor word in the input text, wherein the first location indicates a number of characters from a beginning of the input text to the first location;

determine a second location of the anchor word in the rendered text, wherein the second location indicates a number of characters from a beginning of the electronic rendered text data to the second location;

compare the first location to the second location; and determine that the electronic rendered text data is similar to the electronic input text data based on the comparison of the first location to the second location.

21. The device of claim 16, wherein the memory further comprises instructions that, when executed by the at least one processor, further cause the device to:

determine a first resolution associated with a display;

generate the first image data using the first resolution;

store the first image data in a buffer;

determine a first paragraph boundary, wherein the first paragraph boundary includes pixels in the first image data associated with a first paragraph of the input text;

determine a second paragraph boundary, wherein the second paragraph boundary includes pixels in the first image data associated with a second paragraph of the input text;

display the first image data on the display;

determine the text boundary within the first image data using the first paragraph boundary and the second paragraph boundary, wherein the text boundary includes the pixels in the first image data associated with the first paragraph of the input text and the second paragraph of the input text;

receive the first image data from the buffer; and determine the second image data from the first image data using the text boundary.

* * * * *